(12) United States Patent
Kennedy

(10) Patent No.: US 9,266,785 B2
(45) Date of Patent: Feb. 23, 2016

(54) BIOAVAILABLE MINERALS FOR PLANT HEALTH

(71) Applicant: Zero Gravity Solutions, Inc., Boca Raton, FL (US)

(72) Inventor: John Wayne Kennedy, Stevensville, MD (US)

(73) Assignee: Zero Gravity Solutions, Inc., Boca Raton, FL (US)

(*) Notice: Subject to any disclaimer, the term of this patent is extended or adjusted under 35 U.S.C. 154(b) by 0 days.

(21) Appl. No.: 14/290,547

(22) Filed: May 29, 2014

(65) Prior Publication Data

US 2014/0342915 A1    Nov. 20, 2014

Related U.S. Application Data

(63) Continuation-in-part of application No. 11/932,260, filed on Oct. 31, 2007, now abandoned, which is a continuation-in-part of application No. 11/616,317, filed on Dec. 27, 2006, now abandoned.

(60) Provisional application No. 61/828,233, filed on May 29, 2013.

(51) Int. Cl.
| C05C 9/00 | (2006.01) |
|---|---|
| C05C 11/00 | (2006.01) |
| C05G 3/00 | (2006.01) |
| C05C 3/00 | (2006.01) |

(52) U.S. Cl.
CPC ... *C05C 9/00* (2013.01); *C05C 3/00* (2013.01); *C05C 11/00* (2013.01); *C05G 3/00* (2013.01)

(58) Field of Classification Search
CPC ............ C01F 5/20; C01G 3/14; C01G 51/12; C01G 9/00; C01G 31/00; C01G 39/00; C01G 45/00; A61K 33/24; A61K 33/30; A61K 33/34; A61K 33/02; C05G 3/00; C05C 3/00; C05C 9/00; C05C 11/00
See application file for complete search history.

(56) References Cited

U.S. PATENT DOCUMENTS

| 1,620,490 A | 3/1927 | Sanders |
| 2,655,460 A | 10/1953 | Kise |
| 3,959,255 A | 5/1976 | Chazan |
| 3,981,861 A | 9/1976 | Chazan |
| 4,064,339 A | 12/1977 | Coussediere |
| 4,098,602 A | 7/1978 | Seymour |
| 4,193,993 A | 3/1980 | Hilditch |
| 4,456,463 A * | 6/1984 | Stoller ............... 71/29 |
| 4,906,466 A | 3/1990 | Edwards |
| 4,952,398 A | 8/1990 | Tapin |
| 5,560,821 A | 10/1996 | Leo |
| 5,665,679 A | 9/1997 | McInnes |
| 5,753,493 A | 5/1998 | Wiersma |
| 5,780,064 A | 7/1998 | Meisters |
| 6,015,816 A | 1/2000 | Kostyniak |
| 6,022,545 A | 2/2000 | Schmittmann |
| 6,077,545 A | 6/2000 | Roskos |
| 6,093,414 A | 7/2000 | Capelli |
| 6,241,795 B1 * | 6/2001 | Svec et al. ............ 71/11 |
| 6,277,396 B1 | 8/2001 | Dente |
| 6,277,416 B1 | 8/2001 | Harkrader et al. |
| 6,294,186 B1 | 9/2001 | Beerse |
| 6,346,281 B1 | 2/2002 | DeAth |
| 6,365,130 B1 | 4/2002 | Barry |
| 7,060,302 B1 * | 6/2006 | Hickok ............ 424/617 |
| 7,163,709 B2 | 1/2007 | Cook |
| 2007/0128295 A1 | 6/2007 | Kennedy |
| 2011/0129545 A1 | 6/2011 | Miele |

FOREIGN PATENT DOCUMENTS

| WO | WO01-15554 A1 | 3/2001 |
| WO | WO 2009/058857 | 5/2009 |

OTHER PUBLICATIONS

Arnon, D. I., and P. R. Stout. "The essentiality of certain elements in minute quantity for plants with special reference to copper." Plant physiology 14.2 (1939): 371.*
Goncalves de lima et al., "Antimicrobial compounds from higher plants. XXXVI. Maytenin and pristimerin in the root cortex of Maytenus ilicifolia from southern Brazil", Source: Revista do Instituto de Antibioticos, Universidade Federal de Pernambuco, Recife, vol. 11, Issue: 1, pp. 35-38, Journal, 1971, CODEN: RATRAT, ISSN: 0080-0228 (1 pg.).
PCT International Search Authority, International Search Report for PCT/US14/39994, dated Sep. 17, 2015, 3 pages.
PCT International in Search Authority, Written Opinion for PCT/US14/39994, dated Sep. 17, 2015 (received Dec. 9, 2015), 4 pages.
International Preliminary Report on Patentability PCT/US2008/081577, mailing date May 4, 2010 (6 pages).

* cited by examiner

*Primary Examiner* — Abigail Fisher
*Assistant Examiner* — Daniel Branson
(74) *Attorney, Agent, or Firm* — Thompson Hine LLP

(57) ABSTRACT

A method employing a composition of bioavailable minerals directed at supplementing nutritional intake of a living plant. The composition includes the ionic mineral(s) copper and zinc in a ligand complex and a pharmaceutically acceptable carrier including water, $H_2SO_4$ and $(NH_4)_2SO_4$. The composition for use in the method may also include other supporting plant nutrients such as botanical extracts, urea, plant hormones, vitamins and mineral supplements necessary for plant health.

14 Claims, 11 Drawing Sheets

- Appear to show increased rooting and more likelihood of extensive root hairs in sunflower seedlings grown + BAM-FX
- More limited root structure for fertilizer or water controls
- Shorter/irregular heights of corn + BAM due to greater root production followed by delay in coleoptile emergence

- Apparent "legginess" in fertilizer seedlings, vs. larger leaves relative to height for BAM-FX seedlings
- More roots + BAM-FX (irregular height due to late stem growth/seed germination)
- Less-developed roots for fertilizer or water controls SD – standard deviation (n=4)

| | Treatments were randomized for location of the bucket. | Mass of leaves and Stems (g) | Mas of roots (g, approx.) | # Lateral Stolons | Tuber Initation? | Average Mass - stems and leaves | Average Mass - roots | Average # stolons | SD Mass stems and leaves | SD Mass roots | SD stolons |
|---|---|---|---|---|---|---|---|---|---|---|---|
| 1 | 1 oz/gal BAM soil drench | 45.05 | 3.62 | 13 | Y | 26.6 | 2.1 | 9.5 | 13.1 | 1.1 | 2.4 |
| 5 | 1 oz/gal BAM soil drench | 26.2 | 1.9 | 9 | Y | | | | | | |
| 9 | 1 oz/gal BAM soil drench | 19.92 | 1 | 8 | N | | | | | | |
| 13 | 1 oz/gal BAM soil drench | 15.24 | 1.77 | 8 | Y | | | | | | |
| 3 | 1 oz/gal BAM soil drench AND foliar spray | 7.55 | 1.38 | 5 | N | 39 | 3.7 | 10.3 | 23.1 | 1.6 | 4.1 |
| 7 | 1 oz/gal BAM soil drench AND foliar spray | 59.74 | 4.43 | 14 | Y | | | | | | |
| 11 | 1 oz/gal BAM soil drench AND foliar spray | 52.08 | 4.68 | 13 | Y | | | | | | |
| 15 | 1 oz/gal BAM soil drench AND foliar spray | 36.47 | 4.38 | 9 | Y | | | | | | |
| 2 | 2 oz/gal BAM soil drench | 45.13 | 6.43 | 11 | N | 26.1 | 4.7 | 8.8 | 15.2 | 1.8 | 3.9 |
| 6 | 2 oz/gal BAM soil drench | 30.17 | 2.82 | 13 | Y | | | | | | |
| 10 | 2 oz/gal BAM soil drench | 19.38 | 6.06 | 5 | N | | | | | | |
| 14 | 2 oz/gal BAM soil drench | 9.6 | 3.38 | 6 | N | | | | | | |
| 4 | H2O | 19.7 | 6.75 | 5 | N | 12.2 | 3.4 | 3.5 | 6 | 2.2 | 1.7 |
| 8 | H2O | 14.32 | 2.78 | 5 | N | | | | | | |
| 12 | H2O | 6.4 | 2.16 | 2 | N | | | | | | |
| 16 | H2O | 8.31 | 2 | 2 | N | | | | | | |

FIG. 6

BIOAVAILABLE MINERALS FOR PLANT HEALTH

CROSS-REFERENCE TO RELATED APPLICATIONS

This application claims priority to and is a continuation-in-part of U.S. Ser. No. 11/932,260 (filed Oct. 31, 2007), which is a continuation-in-part application of U.S. Ser. No. 11/616,317 (filed on Dec. 27, 2006). This application also claims priority to U.S. Ser. No. 61/828,233 (filed May 29, 2013). The entirety of each of these applications is incorporated by reference into this specification.

BACKGROUND OF THE INVENTION

Plants can suffer from mineral deficiencies that result in undesirable states. A variety of methods are known for treating these undesirable states but none have been entirely satisfactory. An improved method for treating mineral deficiencies is therefore desired. The discussion above is merely provided for general background information and is not intended to be used as an aid in determining the scope of the claimed subject matter.

BRIEF DESCRIPTION OF THE INVENTION

A composition for treating mineral deficiencies in plants includes at least one complex cation and inorganic coordination complexes formed by the coordinate bond formation between an electropositive mineral cation (positive) and molecular groups that have un-shared electron pairs. The ammonia ligand configuration also acts as an artificial superoxide dismutase (SOD) which acts as a free oxygen scavenger to alleviate plant stress, for example, under drought and mechanical damage.

The formulation as manufactured provides a delivery system for moving mineral ions to the mineral deficient areas in plants using highly bioavailable cations through a complex ligand system. Ammonia ligands form a bond with the free metallic ions, especially zinc and copper to regions of the plant that require such minerals. Other minerals to be named follow the same pattern of dispersal throughout the plant in a systemic nature. The plant's natural metabolism will discard excess metals as described in the metabolic pathways descriptions although an over-whelming amount of the composition is possible and may cause necrosis in the plant. The ionic nature of the formulation allows easy access to areas of the plant with deficiencies and provides a formulation that is superior to current technologies.

The present disclosure relates to a method of supplementing nutritional intake of a living plant, the method comprising steps of: treating a plant with a composition, the composition being formed by: adding ingredients of water, $H_2SO_4$, $(NH_4)_2SO_4$, copper and zinc into a mixture; agitating the mixture until the ingredients are blended together; diluting the mixture with water to form the composition.

The present disclosure relates to a method of supplementing nutritional intake of a healthy, living plant, the method comprising steps of: treating a healthy plant with a composition, the composition being formed by: adding ingredients of water, $H_2SO_4$, $(NH_4)_2SO_4$, copper and zinc into a mixture; agitating the mixture until the ingredients are blended together; diluting the mixture with water.

It has been surprisingly found that the disclosed methods, which utilise a bioavailable mineral composition comprising water, $H_2SO_4$, $(NH_4)_2SO_4$, copper and zinc leads to many positive effects in plants, for example healthy plants, and in particular in food crop plants. Plants treated according to the disclosed method have been found to be faster growing, healthier and/or more robust. Additionally, the disclosed method may allow for fewer applications of the treatment compared to other known mineral treatments (for example PHYTO-PLUS Zinc Shotgun treatment or NPK treatment) leading to considerable cost and time savings.

The benefits of the disclosed methods for supplementing nutritional intake in living plants may be summarized as including one or more of:

Faster time to maturity and harvest, with higher farm yields for food crops

Improved germination of seeds under conditions of abiotic stress

Faster germination of seeds and sprout emergence from growth medium

Increased biomass of plants

Systemic delivery of targeted nutrients and minerals to crops to create more robust plants and more nutritious crops Ability to increase the nutritional quality of cereal grains and produce, including the potential to engineer nutrition into our food (e.g. bio-fortifying lettuce and grapes with zinc, potassium and calcium)

Benefits to crops accomplished organically, without the use of additive or subtractive genetic modification techniques and is therefore considered non-GMO Significantly smaller quantities of additive minerals and growth compounds compared to conventional farming of high yield crops Organic formula and dilute application requirements should substantially reduce economic, social, ecological and regulatory concerns associated with runoff into water sources Use of less water compared to conventional farming methods The ability to deploy self-contained crop growth systems for use in hostile environments such as the polar regions, deserts, underwater habitats and other extreme locations.

The disclosure further provides a method of reducing the time to maturity and harvest comprising supplementing nutritional intake of a living plant by the disclosed method.

The disclosure further provides a method of increasing farm yields for food crops comprising supplementing nutritional intake of a living plant by the disclosed method.

The disclosure further provides a method of creating more robust plants and more nutritious crops by systemic delivery of targeted nutrients and minerals to crops comprising supplementing nutritional intake of a living plant by the disclosed method.

The disclosure further provides a method of increasing the nutritional quality of cereal grains and produce, including the potential to engineer nutrition into our food (e.g. bio-fortifying lettuce and grapes with zinc, potassium and calcium), comprising supplementing nutritional intake of a living plant by the disclosed method.

The disclosure further provides a method of using less water compared to conventional farming methods comprising supplementing nutritional intake of a living plant by the disclosed method.

The disclosure further provides a self-contained crop growth systems for use in hostile environments such as the polar regions, deserts, underwater habitats and other extreme locations, comprising supplementing nutritional intake of a living plant by the disclosed method.

BRIEF DESCRIPTION OF THE FIGURES

FIG. 6 is a table showing the masses of stems and leaves of the potato plants, as well as number of lateral stolons and presence of tubular initiation. Average (mean) masses of stems and leaves of the potato plants, as well as number of lateral stolons for each group is also shown.

DETAILED DESCRIPTION OF THE INVENTION

Figure 1A:
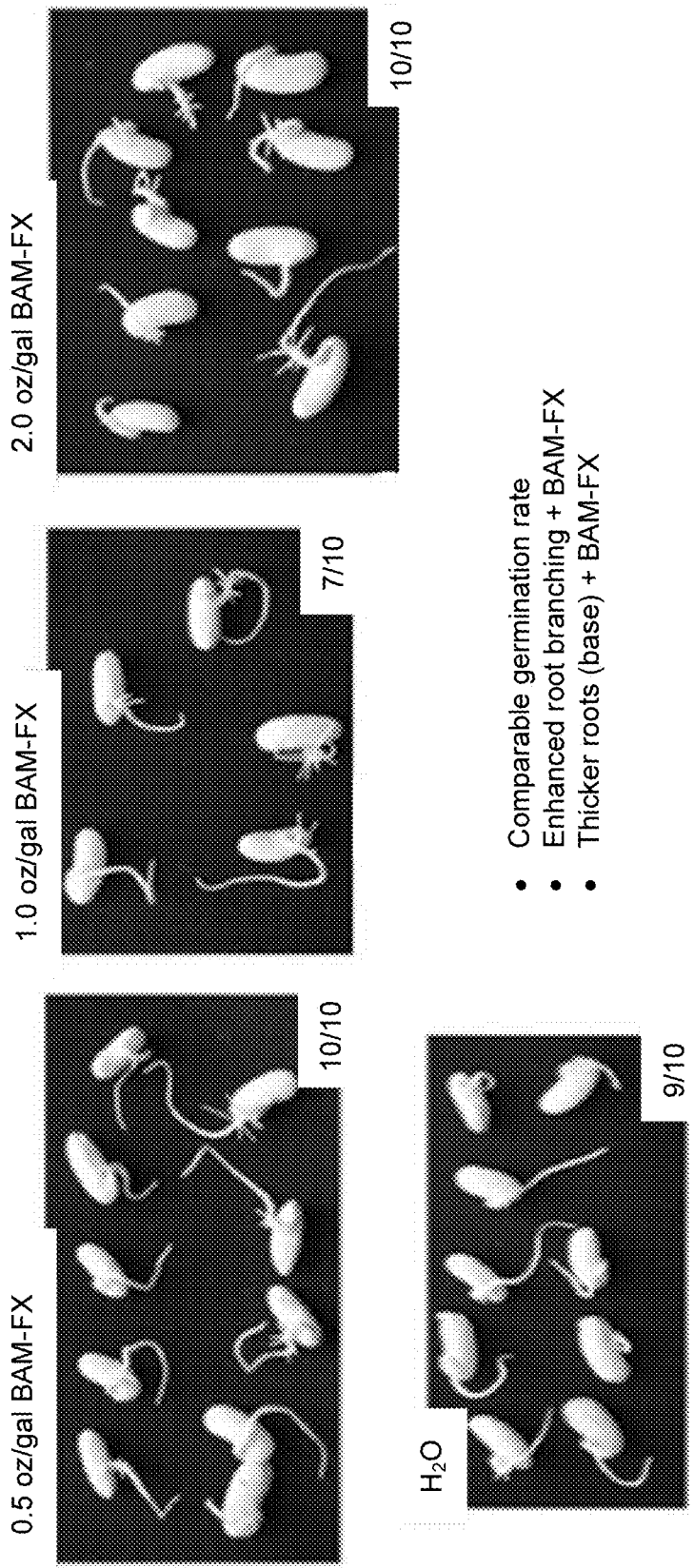
FIG. 1A depicts a comparison of bush bean sprouts seedlings 7 days after soaking with the disclosed composition or water.

The disclosure is related to a chemical composition using bioactive elements that are able to be transported through plant tissue bound to ligands for the purpose of treating mineral deficiencies in plants. The composition can be used by itself or in combinations with other additives for the purposes of promoting plant health.

Bioavailable minerals (BAMs) allow for customized minerals supplementation of plants showing signs of stress. A composition of the various minerals for treating plant deficiencies includes a therapeutically effective amount of an ionic mineral complex and a pharmaceutically acceptable carrier. The ionic mineral complex is an ionic mineral cation ligand bonded to a plurality of ammonia molecules enabling transport of the ionic mineral complex through a biological system to a target area affected by plant deficiency. The cation is it at least one of zinc, manganese, copper, magnesium, cobalt, chromium, molybdenum, vanadium and other minerals. Mineral deficiencies noted in plants can be diagnosed through observation of their leaves and other characteristics common to specific minerals. Analysis of plant tissue will also provide horticulturist with an understanding of the particular needs and be able to prescribe specific combinations of the BAMs.

The Krebs cycle describes the metabolic pathways of the higher plants and animals where the parallel use of available fuels, oxygen, water, and other essentials follow the same basic metabolism of the sugars, fats and proteins. The metabolic system is a well documented and familiar process. The protection provided by at least thirty-two steps in the process provides a system that protects oxygen-driven plants and animals. Any excess ionic elements will be discarded unless supplied at extremely high rates.

Lower order organisms are not as complex regarding the metabolic pathway as the higher order organisms. The cycle followed by lower order diseases such as bacteria, fungi and virus follow a less complicated process that allows disease to multiply at an almost exponential rate based on available resources in an anaerobic cycle that has far fewer steps. Plant cells that are weakened by mineral deficiencies are attacked by disease, insects and other predators. Fortifying plants by providing mineral supplements in the form of ionic metals allows for simple diffusion and immediate "first aid" for plants stressed by specific mineral deficiencies and may save a specimen plant or even an entire crop. Healthy plants reinforced with bioavailable minerals are less likely to succumb to disease, insects and environmental factors. Healthy plants reinforced with bioavailable minerals according to the disclosed method show improved growth, leading to faster times to maturity and harvest and higher yields, compared to untreated plants and plants treated with other additives (for example PHYTO-PLUS Zinc Shotgun treatment or NPK treatment). Healthy plants reinforced with bioavailable minerals according to the disclosed method also require less water than untreated plants.

A method of producing a composition for treating plant nutrient deficiencies includes steps of adding ammonium hydrogen sulfate $((NH_4)HSO_4)$ with at least one mineral composition (a salt) and distilled water to the mixture, agitating the mixture and diluting the mixture to a desired concentration. The activity of agitating is a slow agitation process performed at a speed slow enough to reduce extreme interaction between the ingredients. The diluted mixture includes at least one ionic mineral complex encapsulated by ligand-bound ammonia molecules. The diluted mixture may be combined with a pharmaceutically acceptable carrier for delivery as well as other ingredients as heretofore described. The pharmaceutically acceptable carrier and/or other ingredients may be combined at the manufacturing site or later to develop a custom made composition for any particular need.

The storage, transport and eventual use of transition metals utilizing the ligand systems provide appropriate concentrations for delivery to all parts of the plant through topical application, hydroponically or drenches. The required range for each metal in a biological system is narrow with both deficiencies and excesses causing pathological symptoms and necrosis. The higher plants are composed of a variety of specialized cells that regulate the proper amounts of BAMs for use in the plant. To that end, plants have mechanisms of metal homeostasis which involve coordination of metal ion transporters for uptake, translocation and compartmentalization. Organic molecules have been implicated in metal ion homeostasis as metal ion ligands to facilitate uptake and transport of metal ions with low solubility and also as chelators implicated in sequestration for metal tolerance and storage. Plants have mechanisms for metal homeostasis that allows uptake and distribution of metals to tissues while maintaining metals within cells or subcellular compartments below levels that cause toxic symptoms. Metal ions that occupy sites in proteins are expected to be bound to low molecular weight metal ligands that have intracellular roles as chelators for sequestering metal ions in organic matrices such as cytosol and proteins. Plants have transport mechanisms for the secretion or uptake of metal ion ligands by cells or for the movement of ligands between subcellular compartments.

Plants that are exposed to heavy metals will up-take if deficient in the primary metals required. Zinc and copper must be in sufficient quantities and balanced according to the mineral interrelationships to keep heavy metals from being absorbed by this bioavailable method. The zinc and copper will prevent any heavy metal intake because the "spots" they would occupy are already taken by the essential metals.

The manufacture and use of the BAMs provide ionic elements bound in ammonia ligands for the purpose of reinforcing the supply of metal ions to the plant to boost the immune system of the plant and provide adequate elements for prevention of mineral deficiencies. The BAMs can be applied topically through spray systems, irrigation, injection into the plant or hydroponically. Soil trenching is considered not as efficient a method of introducing the BAMs since the ammonia ligand/metallic ions complexes are bound to the organic soil particles and are not as bioavailable to the plant.

Transition metals for use in biological storage and transport in order of decreasing abundance in living organisms are; iron, zinc, copper, molybdenum, cobalt, chromium, vanadium, and nickel and are necessary in such biological processes as cell division (iron, cobalt), nitrogen fixation (iron, molybdenum, vanadium), and photosynthesis (manganese, iron). Zinc is involved in many hydraulic reactions and in the control of gene activity by proteins for example.

There are seventeen (17) essential plant nutrients. Carbon and oxygen are absorbed from the air. Other nutrients including water and minerals are obtained from the soil. Plants must obtain the following mineral nutrients from the growing media;

1. The primary macronutrients include nitrogen, phosphorus, and potassium.
2. The three secondary macronutrients are calcium, sulfur, and magnesium. The macronutrient silicon is also included.
3. The micronutrients (trace minerals) include boron, cobalt, manganese, iron, zinc, copper, molybdenum, nickel, selenium, and sodium.

The uptake of plants anchored in soil is achieved by cation exchange through the ruts as simple diffusion with non-polar molecules such as oxygen, carbon dioxide, and ammonia that follow a concentration gradient and passively move through the Lipan bilayer membrane without the use of transport proteins. Other unrelated means of diffusion include facilitated diffusion where rapid movement of solutes or ions following a concentration gradient are facilitated by transport proteins. An active transport of ions or molecules against a concentration gradient is another means but requires an energy source, usually adenosine triphosphate (ATP) to pump the ions or molecules through the membrane. The low molecular weight of this formulation allows for more rapid movement to areas of lower concentration.

The use of ammonia ligands attached to metal ions is disclosed in a method of diffusion through the roots, foliage or in use of hydroponics or the nutrient film technique—a variation of the hydroponics technique. Brett trenching of plants is a less efficient method of use of this composition but will provide a source of trace elements. Limited amounts will be available in comparison to foliar or hydroponics and nutrient film techniques. The non-polar ammonia ligands will be incorporated into the plant by simple diffusion through the above ground portion of the plants including leaves and stems. Diffusion of the ligands will also occur in soil application, hydroponic or nutrient film technique and these diffusion techniques will follow a concentration gradient and passively move through the bipolar lipoid membrane without the use of transport proteins or the need for high-end pumps to move the molecules through the membrane.

The nutrient uptake in soil achieved by cation exchange where root hairs pump hydrogen ions into the soil through proton pumps may be aided by the use of the ammonia ligands carrying metal cations thereby making them more bioavailable to the plant.

Macronutrients include carbon that is the backbone of many plants bimolecular structure including starches and cellulose. Carbon is fixed through photosynthesis from the carbon dioxide in the air and is part of the carbohydrates and sugars in a plant. Hydrogen is necessary for building sugars and obtained almost entirely from water. The ammonia ligands in the disclosed formulation can also provide a source of hydrogen that is imperative for a proton gradient that drives the electron transport chain and photosynthesis and plant respiration. Oxygen by itself or in a molecule of water or carbon dioxide are necessary for plant cellular respiration, the process of generating energy—rich adenosine triphosphate (ATP) via the consumption of sugars made in photosynthesis. Oxygen gas is produced during photosynthesis to produce glucose but then oxygen is required to undergo a Rubik photorespiration to break down the glucose and produce ATP. The described energy generation cannot be achieved without the essential minerals and the system would waver if the key element in a highly bioavailable system were not present.

Primary macronutrients include phosphorus which is important in plant bioenergetics and is a component of ATP and needed for the conversion of light energy to chemical energy (ATP) during photosynthesis. Phosphorus is also used to modify the activity of enzymes by phosphorylation and can be used for cell signaling. It is used for biosynthesis of many plant molecules and is important for plant growth and flower/seed formation. Phosphate esters are a component of DNA, RNA, and phospholipids. Potassium is important for regulation of the opening and closing of stomata and therefore is important in water regulation from the leaves thus increasing drought tolerance. Potassium also aids in building cellulose and aids in photosynthesis. Nitrogen is an essential component of all proteins and can be assimilated by some plants directly from the air but most forms are taken up through the soil.

Secondary macronutrients include sulfur, a structural component of some amino acids and vitamins and essential for the manufacturing of chloroplasts. It is also in the iron sulfate complexes of the electron transport chains and photosynthesis. Calcium regulates transport of other nutrients into the plant and is involved in the activation of certain plant enzymes. Magnesium is crucial for chlorophyll construction—an important plant pigment involved in photosynthesis. Magnesium acts as an enzyme cofactor in the production of ATP. Silicon strengthens cell walls and improves plants strength, health, and productivity. Benefits include improved drought and frost resistance and boost the plant's natural pest and disease fighting systems. Many benefits to numerous plant species are derived from the presence of silica.

Micronutrients are elements not directly involved in plant metabolism but whose presence have positive effects on plant growth. Micronutrients stimulate growth but are not essential, with few exceptions to certain plant species under certain conditions. For example iron promotes photosynthesis and is present as an enzyme cofactor in plants. Iron is not a structural part of chlorophyll but is essential for its synthesis. Molybdenum is a cofactor to enzymes for building amino acids and nitrogen metabolism. Boron is important in binding pectins in the primary cell walls, sugar transport, cell division and possibly synthesizing certain enzymes. Copper is important for photosynthesis and many enzyme processes and the manufacture of lignin (cell walls). Manganese is necessary for photosynthesis and building of chloroplasts. Sodium is a part of the regeneration of phospholpyruvate and a substitute for potassium in some circumstances. Zinc is used in a large number of enzymes and is essential in DNA transcription. Nickel is used for activation of urease, and enzymes involved with nitrogen metabolism that are required to process urea or the urea would accumulate to toxic levels. Chlorine is necessary for osmosis and ionic balance and plays a role in photosynthesis. Cobalt is essential to plants such as legumes and is required for nitrogen fixation in the symbiotic relationship it has with nitrogen fixing bacteria. Vanadium may be required by some plants but only at very low concentrations and substituted for the molybdenum. Sodium can replace potassium in regulation of stomatal opening and closing.

MODE OF OPERATION

The composition uses ionic mineral complexes that are capable of penetrating through plant parts including stems, leaves and roots while having little adverse affect on normal cell operations. Further, ionic mineral complexes are capable of penetrating cell membranes at a rapid pace through simple diffusion.

Manufacturing Process

The manufacturing process described below produces a complex having ammonia ligand bonds with specific cations. The cations are carried by the ligand bonds and protected from being immediately bonded with the first available negative ions thus enabling free movement between and within the cells of the plant. Each of the minerals will be processed in the acid/base solution resulting in products that have a high acidity value, yet not being corrosive to living tissue. A noticeable concentration of reactive ammonia is also produced by the acid/base reaction. Complex cations and inorganic coordination complexes are formed that are able to move the cations in a relatively stable fashion and allow transport throughout the plant.

Chemistry

Ammonium Sulfate and Sulfuric acid:

DEFINITION OF TERMS

1. Sulfuric acid $H_2SO_4$ molecular weight=98.07 g/mole
2. Ammonium sulfate $(NH_4)_2SO_4$ molecular weight=132.23 g/mole
3. Ammonium hydrogen sulfate $(NH_4)HSO_4$ molecular weight=115.10 g/mole (Ammonium bisulfate)

The sulfuric acid and ammonia are combined in the presence of water.

$$H_2SO_4 + NH_3 + H_2O \rightarrow (NH_4)_2SO_4 + 2H_2O$$

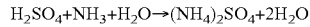

98 g. 34 g. 36 g. 132 g. 36 g.

The ammonia sulfate and water has a typical pH of 5.5-6.0. Ammonium sulfate by itself when dissolved in water does not exhibit any ammonia odor. Solid ammonium sulfate can disassociate, using one mole of ammonia and converting it to ammonium hydrogen sulfate $$(NH_4)_2SO_4 \rightarrow NH_3 + NH_4HSO_4$$

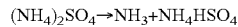

In the presence of water, the ammonia loss can then recombine to $$NH_3 + H_2O \rightarrow NH_4OH \text{ or } (NH_4)^{+1} + (OH)^{-1}$$

The ammonium bisulfate, being a weakly acidic salt, does not react with the diluted and weak base, ammonium hydroxide to recombine into ammonium sulfate. Ammonium hydrogen sulfate is more acidic than ammonium sulfate. Neither a solution of ammonium sulfate nor ammonium bisulfate will burn the skin on contact. Additional loss of ammonia from solid ammonium hydrogen sulfate under conditions of high heat and moisture provides the following;

$$NH_4HSO_4 + heat + moisture \rightarrow NH_3 + H_2SO_4 + H_2O$$

The result is sulfuric acid. Sulfuric acid and ammonium hydrogen sulfate are a basic building block for producing the ligand bonded cation complex hereinafter referred to as the ligand complex.

Ammonium hydrogen sulfate may be generated by two methods;

1. $H_2SO_4 + NH_4OH \rightarrow NH_4HSO_4$ (one mole of sulfuric acid and one mole of ammonium hydroxide (ammonia).
2. $H_2SO_4 + (NH_4)_2SO_4 \rightarrow NH_4HSO_4$ (one mole of sulfuric acid and one mole of ammonium sulfate).

The first reaction is very exothermic, and because the ammonia in water is not stable, ammonia fumes are generated thereby reducing the amount of ammonia available to react with the sulfuric acid. The result is a very acidic solution, having a small quantity of sulfuric acid un-reacted due to the loss of some quantity of the ammonia in the steam generated by the highly exothermic reaction. This is less desirable than the second reaction that is the preferred process used to produce the composition for use in preparing plant nutrients.

The physical and chemical properties of the ligand complex are shown below

Boiling point; 224.2° F.
Vapor pressure; 0.1 MM at 68° F.
Vapor density; 1.00
Solubility in water: very soluble
Appearance and odor: clear liquid—mild odor
Specific gravity: 1.35
Melting point: not applicable
Evaporation rate: not applicable
Flashpoint: none
Flammability limits: none
Stability: stable
pH: less than 1.0

Complex Ion Formation and Ligand Bonds

The complex ions and inorganic coordination complexes are formed by the coordinate bond formation between an electro positive mineral cation (positive) and molecular groups that possesses unshared electron pairs (ammonia). Every metal ion has at least one coordination sphere which determines the number of coordinate bonds possible for each mineral atom. The coordinate bonds attract negatively charged ions possessing unshared electron pairs. All cations except groups IA and IIA (periodic table) exist as complex cations with a definite number of coordinating groups bound to them. The cations use the unshared pair in attempting to fill gaps in the outer electron orbitals where those electron shells are incomplete. The bonds formed between the cation and the unshared pair of electrons are ligand bonds.

An exemplary compound produced as a result of the acid/base reaction when sulfuric acid is combined with ammonia sulfate described above is ammonia ($NH_3$) one of the products formed in the acid/base reaction. Ammonia is one of the compounds having an unshared pair of electrons that enables ligand bond formation between itself and the free cation in solution. The nitrogen molecule of the ammonia includes an unshared pair of electrons. Ammonia is very reactive in ligand binding due to its respectively small size, and the unshared pair of electrons. The three hydrogen atoms cannot equalized the charge due to repulsion between the electron pair making ammonia polar. Therefore, ammonia may enter into the following examples of complexes:

The number of ammonia molecules is double the metallic ion valence, and the valence charge does not change. The unshared pair of electrons forms the ligand bond, the ligand supplying both the unshared electrons. The resulting compound is a plurality of ammonia molecules ligand bonded to a single molecule of ionic zinc forming a "BAM" (encapsulated mineral(s) surrounded by ammonia "ligand bonds").

The molecular diagram shown below is for purposes of example only and the zinc cation may be substituted by any of the cation shown in the next table.

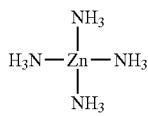

This compound, including ammonia encapsulating a bioactive mineral cation, is herein after referred to as a ligand complex. Additionally, urea may be included in the formulation and result in ligand bonding of the cations with the urea. The urea may degrade soil particles to some extent and make the minerals and all aspects of the complex organic soils more bioavailable when in combination with this formulation. In this composition, the BAM could be formulated with urea producing a product containing higher than anticipated mineral content and produce higher than normal benefits to this formulation.

Examples of the ligand compounds may include, but are not limited to the following complexes shown below:

ION-COMPLEXES WITH AMMONIA (Ligand complexes)
1. Zinc $Zn(NH_3)_4\}^{+2}$
2. Manganese $Mn(NH_3)_4\}^{+2}$
3. Copper $Cu(NH_3)_4\}^{+2}$
4. Magnesium $Mg(NH_3)_4\}^{+2}$
5. Cobalt $Co(NH_3)_4\}^{+2}$—$Co(NH_3)_6\}^{+3}+1e^-$
6. Chromium
   Tri-valent $Cr(NH_3)_6\}^{+3}$
   Hexa-valent $Cr(NH_3)_{12}\}^{+6}$
7. Molybdenum $Mo(NH_3)_6\}^{+3}$
8. Selenium $Se(NH_3)_8\}^{+4}$
   $Se(NH_3)_{12}\}^{+6}$
9. Vanadium $V(NH_3)_{10}\}^{+5}$ Normally, in aqueous solutions without complexing agents, cobalt+2 is the favored state. In the presence of complexing agents such as ammonia ($NH_3$), the complexes of cobalt have greater stability.

Additionally, ligand bonding is conducive to maintain the abundance of hydrogen ions. The resulting solution has a very low pH (at or near zero) reading because of the ligand bonded mineral ions. The product does not act as a conventional acid because of the stability of the mixture of ligands. The pH of the products are not indicative of the expected acid characteristics one might imagine at a pH of 1.0 or below. The solution can only be reduced by non-heat evaporation to a certain volume.

It is possible to mix the various minerals described in table 3 according to the process described in U.S. Pat. No. 7,163, 709 which is co-owned by applicant and incorporated herein by reference.

Secondary Active Complexes

The chemical reactions described above resulted in the mixture including a high level of sulfur which functions as a secondary active complex that operates synergistically with the ligand complex described above by providing the plants with an additional source of sulfur. The high level of free sulfur is able to be transported to the various locations in the biological system by normal mode of transport and works to speed reconstitution of damaged tissue and build new cells. Sulfur is a non-metallic acidic macro mineral usually consumed as part of a larger compound (zinc, copper, etc.).

Method of Manufacture

An exemplary method of producing the composition having a ligand complex is described herein. Ammonium hydrogen sulfate ($NH_4HSO_4$) is prepared as described above and is used in the concentrated form. The ammonium hydrogen sulfate is added to distilled water. The minerals added which are dissociated to become the bioavailable ionic mineral ligand complex are added in their respective sulfate forms, e.g. zinc sulfate, copper sulfate, magnesium sulfate, etc. any of the minerals listed above may be in their sulfate formed be mixed with the ammonium hydrogen sulfate and distilled water to produce the ligand complex. In one embodiment, the mineral's salt purity is manufacturing or pharmaceutical grade with no mineral impurities. The processing of the minerals to form BAMs is only a general guideline and the concentration of the minerals in the solution can be adjusted to produce custom-made formulations to suit any particular agricultural need.

An exemplary composition for making one gallon of the nine (9) mineral complexes listed above involves preparing a mix, under agitation, slowly adding the combinations to prevent an exothermic reaction of the following ingredients:

98 ounces of water ($H_2O$)
14 ounces of ammonium hydrogen sulfate ($NH_4HSO_4$)
16 ounces (one of the nine listed) mineral salts alone or in combination(s) with other minerals on the list to make a total of 16 ounces of mineral.

The exemplary composition may include, for example, 16 ounces of zinc sulfate; or 8 ounces of zinc sulfate and 8 ounces of copper sulfate; or 8 ounces of zinc sulfate, 4 ounces of copper sulfate and 4 ounces of magnesium sulfate. The amount of mineral additives will vary with the intended purpose. For example the addition of iron and manganese or any other of the minerals may be included as required for any particular mineral deficiency in crops and the amounts utilized adjusted to provide for the purpose intended.

Any sulfate form of the minerals listed above are the preferred salts but other salts can be used and may be combined in any ratio to equal 16 ounces. The composition may include any number of minerals sulfate complexes in order to produce a composition having a number of ligand complexes equal to the number of different minerals in the minerals sulfate complexes added during mixing. The description of the mineral composition in their sulfate form is for purposes of example only and any other form of mineral composition including but not limited to oxides, carbonates, nitrates and others may also be used to produce the composition. Variation in the concentrations of the components may vary on the percentages depending on the additives and understanding of the multitude of practical applications in the field.

Each of the positively charged mineral complexes also acts independently much as a gas behaves in Dalton's law. A solution containing a mix of the prepared minerals will act independent of one another and be simulated by the plant on an as-needed basis. For example, copper and zinc can be antagonistic to one another (Mineral Interaction Chart).

Bioavailable Minerals for Plant Health

A solution containing a mix of the prepared mineral(s) may contain only one of the minerals and additional supplements or all of the mentioned minerals plus selected supplements to achieve the desired effect. For example a zinc deficiency may only require zinc and a small amount of copper to balance (Mineral Inter-relationships) the effect of the possibility of too much zinc and other supplements (urea for example) to reinforce the effect of the mineral. All the minerals will act independent of one another much as gases do in Dalton's Law and be assimilated by the plant on an as-needed basis. For example, copper and zinc can be antagonistic to one another in a plant, but the two minerals can be put into the BAM formulation at the right proportions and counter act the influence of one against the other. The copper and zinc also act to counterbalanced each other physiologically on a basis of 7:2 mole ratio (zinc to copper) and with the ammonia ($NH_3$) form BAMs, a form of ligand complex. The ligand travels through the selective membrane (epidermis) and travels through the plants xylem and/or phloem to a mineral deficient tissue where a physiological change will occur and the minerals are un-encapsulated from the ligand complex and are usable as part of the metabolic pathway in the plant.

The ligand formation is obtained during manufacture. However, the use of the ionic mineral in the formulation can be utilized to form an artificial superoxide dismutase (SOD). Plants normally form SODs however since silicon is necessary in most higher plants and is needed in grasses and other plants to support the structure. An example of incorporation of a BAM as described with reference to the superoxide dismutase (SOD) cycle will use copper (Cu) and zinc (Zn). The BAMs will be incorporated into the SOD on an as needed basis and attached to the mineral complex to make a Cu-SOD, a Zn-SOD, or a Cu/Zn-SOD. The enzyme superoxide dismutase catalyzes dismutation of super oxide into oxygen and hydrogen peroxide. Therefore, it is an important antioxidant defense in almost all cells exposed to oxygen. The SOD catalyzed dismutation of super oxide may be written using the following half reactions:

$$M^{(n+1)} + SOD + O^{2-} \rightarrow M^{(n+)} + SOD + O_2$$

$$M(+) + SOD + O^{2-} + 2H^+ \rightarrow M^{(n+1)} + SOD + H_2O_2.$$

Where M may be, but is not limited to:
(a) Cu(n=1); (b) Zn (n=2); (c) Mn(n=2); Fe(n=2); (e) Ni(n=2).

In this reaction the oxidation state of the metal cation oscillates between n and n+1. Several common forms of SOD exist and are proteins co-factored with copper (Cu) and zinc (Zn), manganese (Mn), iron (Fe) or nickel (Ni). Cytosols of almost all eukaryotic cells contain SODs and combine with copper and zinc (Cu—Zn-SOD)s. The Cu—Zn SOD and design is a homodimer of molecular weight of approximately 32,500. The Cu and Zn are joined primarily by hydrophobic and electrostatic interactions. The ligand complexes of copper and zinc are histidine side chains whereas the ligand complexes of manganese ions are three histidine side chains. The incorporation of the ligand complex into the SOD enables the ligand complex to travel throughout the plant in a protected form and without compromising the effectiveness of the ligand complex. Once the SOD with the ligand complex reaches a target cell the cation within the ligand complex is released into the cell.

The resulting formulation can be prepared in many ways for application and will vary with the intended use. Formulations prepared for treatment for plant mineral deficiency will require selection of the proper formulation containing the necessary minerals. The formulations are stable at a pH near or below pH 1.0 in a wide variety of carriers. However, the active composition is prepared using the liquid. Additionally, the low pH of the composition may be diminished if the composition crystallizes.

The mineral cation ingredients in the active composition will vary in proportion depending on the intended use and be added in certain formulation depending on the type and purpose thereof. The added inert ingredients used in the formulation will also vary considerably depending on the site and purpose of the application. Other active compounds may be added if the proposed components prove to be beneficial to the formulation. However, the basic ingredients are known to be effective without any additional components.

Additional elements may be added to the composition that aid in the overall effectiveness of the formula. For example, plant extracts and urea have demonstrated additional effectiveness for certain plant groups. Auxins and plant hormones may be useful for specific uses such as plant propagation techniques.

Methods of Application of BAM Minerals to Target Sites.

Treatment of mineral deficiencies and/or promoting general health of the plant may be carried out by topical application, hydroponics, nutrient film techniques or application to the roots and soil at the base of the plant. The composition can also be applied as an injectable into trees in the xylem and phloem for distribution throughout the plant. In cases where there is a special effort to incorporate minerals into a plant to ensure absorption the plant seeds, bulbs, tubers, suckers or other plant parts used in the propagation of a plant may be soaked, sprayed, drenched or submerged in a diluted solution (1:2 and above). The emerging plant can be watered by spraying, misting, drenching directly or by means of irrigation, drip application, hydraulic sprayers, ultra-low volume (ulv) sprays by ground or by aircraft. Periodic applications may be necessary in areas of high rain fall, high transpiration of plants or frequent stripping of fruit, leaves, grains or other usable parts of the plant to insure proper growth and survival of the plant especially in areas with poor soils. The continual replenishment of the formulation in hydroponic, nutrient film and other liquid systems not only in the fluids but also to the top of the plant is possible since the formulation is systemic even to the dermal surface of leaves and other plant structures. The formulation can also be applied as a "spike" loaded with the formulation next to the plant by itself or in a matrix around the plant or plants. The spikes can be recharged by application of more liquid formulation at intervals or a porous material containing the formulation. The formulations can also be incorporated into gels and agars for use in replicating undifferentiated plant cells on orbit or on terra firma or starting plants from single apical, brachial or other meristem cells. Special formulations in gels, agar or like substances can be used in formulations for starting seedlings on their way or in rooting cuttings, splicing rootstocks to new varieties or attaching cuttings to stems.

DISCUSSION

It will be understood that each of the elements described above, or two or more elements together may also find a useful application in other types of methods differing from the methods described above.

Topical applications may include but not limited to (1) High volume applications using spray rigs capable of 200 plus gallons per acre (2) Low volume applications below 200 gallons per acre (3) Ultra-low volume is at or below 10 gallons per acre.

All of the above applications use specific systems and can be applied by irrigation: (1) High-volume sprayers typically used in orchards, (2) Low volume and ultra low volume used for dispensing formulations in higher humidity circumstances, (3) Hydroponics and nutrient film techniques of current use are adequate but this formulation can also be applied topically since the product is systemic.

Since the invention is described with reference to different embodiments and pointed out in the annexed claims, and since numerous modifications and changes may become readily apparent to those skilled in the art after reading this disclosure, it should be understood that we do not wish to limit the scope of the overall invention to the exact composition, or method of making same, described above and claim below, since it is understood that various omissions, modifications, substitutions and changes in the forms and details of the invention and its application can be made by those skilled in the art without departing in any way from the spirit of the present invention.

EXAMPLES

Example 1

Informal Case Study

When growing plants from seeds, faster germination time and early root development have vital implications for plants. Young seedlings that need a strong start, including development of strong root systems, have the best chance of surviving the first 10-30 days of life. The seedlings also gain improved hardiness for adverse conditions (abiotic stressors and climate stress), increased tolerance of insect attack, and better physical stability of plants in growth medium (pots, soil).

This preliminary test aimed to see if the product has any obvious effects on seed germination or early development (root growth, cotyledon emergence, biomass).

Experiment Design

Seeds were tested with different applications of BAM-FX (a composition formed from 20% m/m zinc and copper in 7:2 mole ratio; 10% m/m ammonium sulfate and 70% m/m water) as follows:
1. Seed soak—lettuce, sweet corn, bush bean, tomato, cantaloupe, squash; 10 seeds each, 30 minute soak (10 min for lettuce); BAM-FX at 0.5, 1.0 or 2.0 oz/gal; $H_2O$ control
2. Sprouting and root development of seeds—BAM-FX vs water vs fertilizer, seeds planted in coir plugs: BAM-FX at 1.0 or 2.0 oz/gal; $H_2O$ control Seeds from seed soak and plugs incubated at room temperature plus light or on heat mats with light. Units are U.S. ounces or U.S. gallons.

RESULTS

Seed Soak Testing
Seed germination after soaking seeds causes:
No negative impact of BAM-FX on germination timing, possible accelerated development (lettuce)
BAM-FX improved root thickness and/or branching
BAM-FX improved growth of lettuce in a warm (stress) condition
Best concentrations of BAM-FX for seed soaking are 0.5 or 1.0 oz/gal FIG. 1A shows a comparison of bush bean sprouts seedlings 7 days after soaking with BAM-FX or water. Blue Lake 47 bean seeds were soaked in BAM-FX or water (control) for 30 minutes and allowed to germinate in a moist environment, at room temperature with ambient light. (n=10)

Figure 1B:
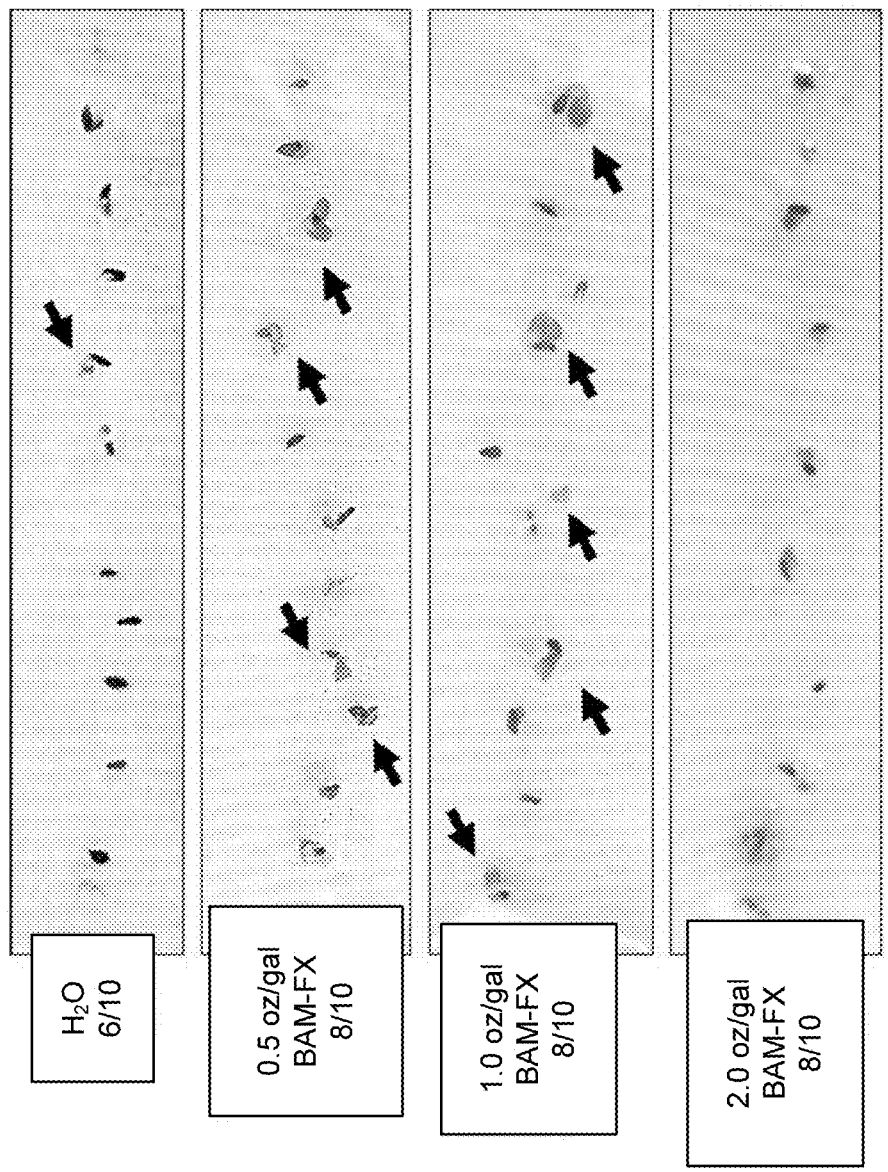
FIG. 1B shows lettuce seedling roots 7 days after soaking.

FIG. 1B shows lettuce seedling roots 7 days after soaking. Green Ice lettuce seeds were soaked in BAM-FX or water (control) for 10 minutes and allowed to germinate in a moist environment, at warm temperature with light. (n=10)

Figure 1C:
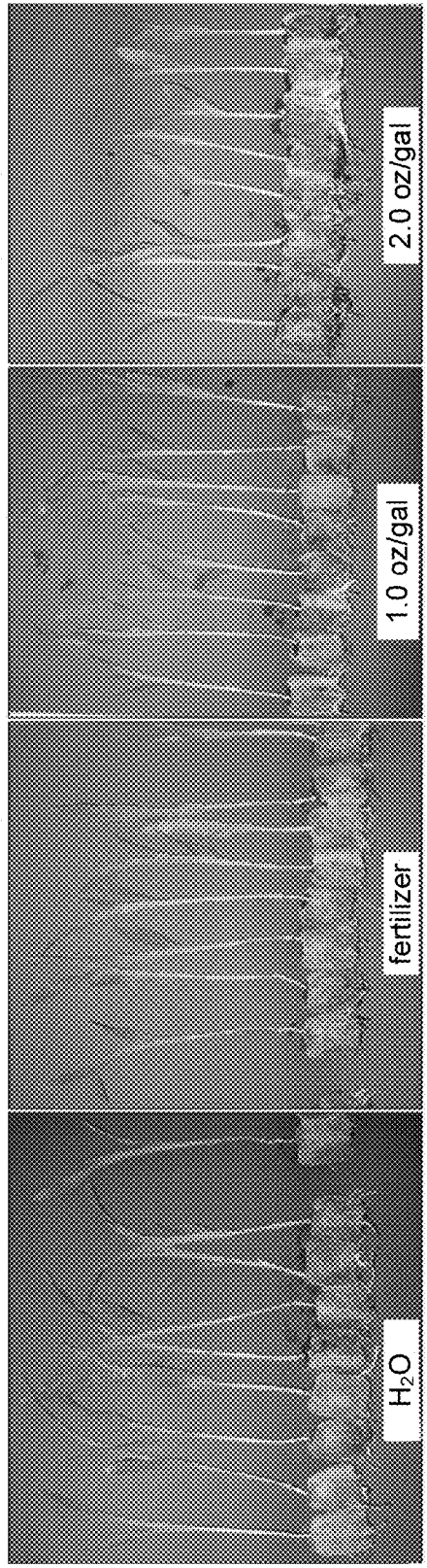
FIG. 1C depicts sweet corn seedlings in coir plugs.
Figure 1D:
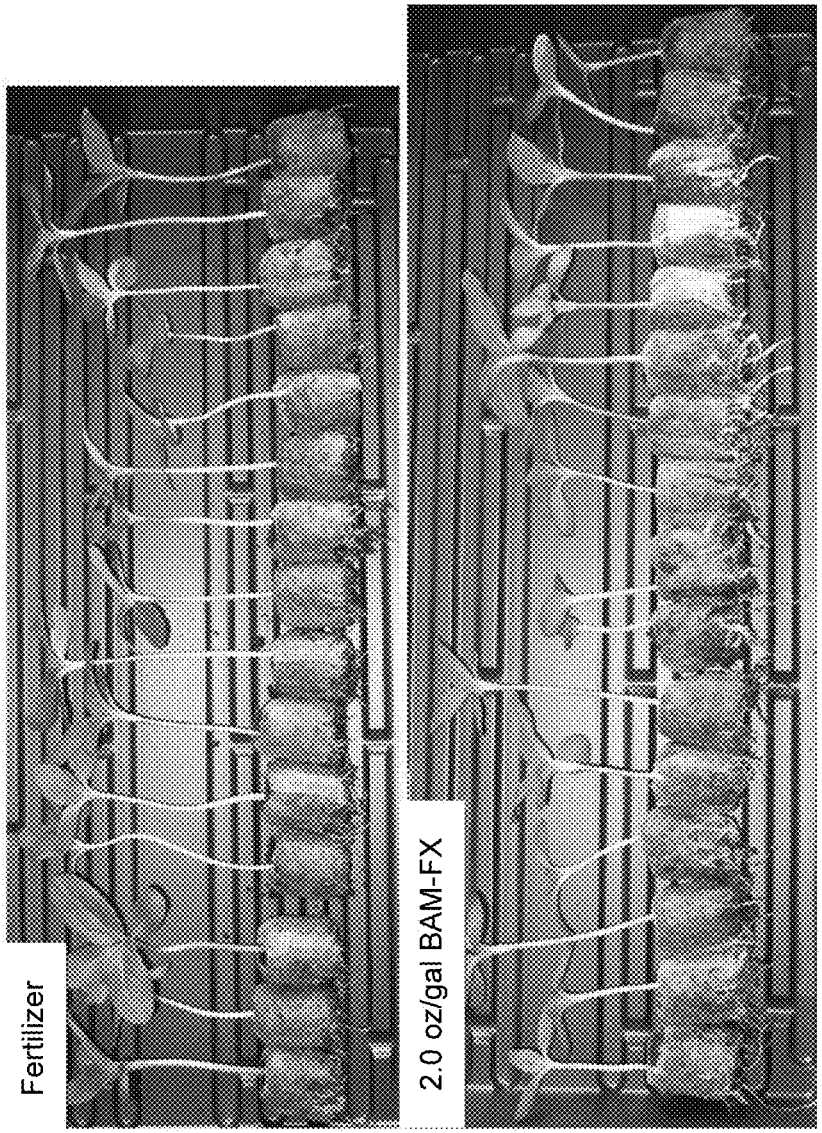
FIG. 1D depicts sunflower seedlings in coir plugs.

FIG. 1C depicts sweet corn seedlings in coir plugs. FIG. 1D depicts sunflower seedlings in coir plugs. Sunflower or corn seedlings in Coir plugs:
BAM-FX resulted in a marked improvement in root structure, compared to fertilizer or water
Thicker roots, with increased branching and/or more root hairs
In this test, BAM-FX caused a delay on the emergence of visible sprouts from coir plugs
Despite delay, BAM-FX-treated sunflower seedlings had larger leaf size/area than fertilizer or water control groups
The seedlings at 2.0 oz/gal show delayed sprout emergence, in favor of greater root development Sweet corn seeds were planted in coir plugs and treated with BAM-FX or water (control) or fertilizer (10-10-10 NPK, control) and allowed to germinate in a moist environment, at warm temperature with light. A representative sampling (of approximately 65 seedlings) is shown.

Black oil sunflower seeds were planted in coir plugs and treated with BAM-FX or water (control) or fertilizer (10-10-10 NPK, control) and allowed to germinate in a moist environment, at warm temperature with light. A representative sampling (of ~65 seedlings) is shown.

Figure 1E:
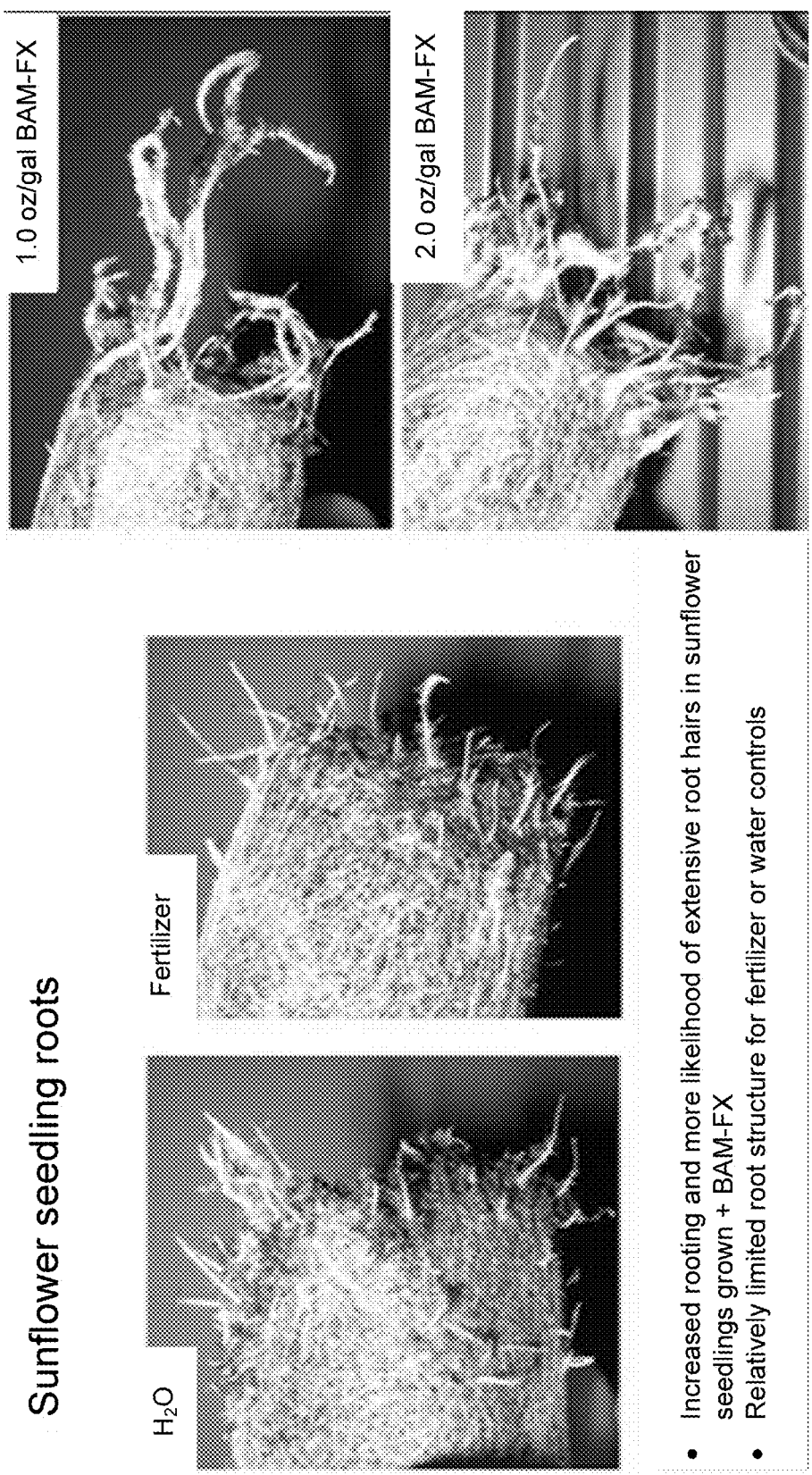
FIG. 1E illustrates roots of sunflower seedlings in coir plugs.

FIG. 1E illustrates roots of sunflower seedlings in coir plugs. Black oil sunflower seeds were planted in coir plugs and treated with BAM-FX or water (control) or fertilizer (10-10-10 NPK, control) and allowed to germinate in a moist environment, at warm temperature with light. A representative sampling (of ~65 seedlings) is shown.

Figure 1F:
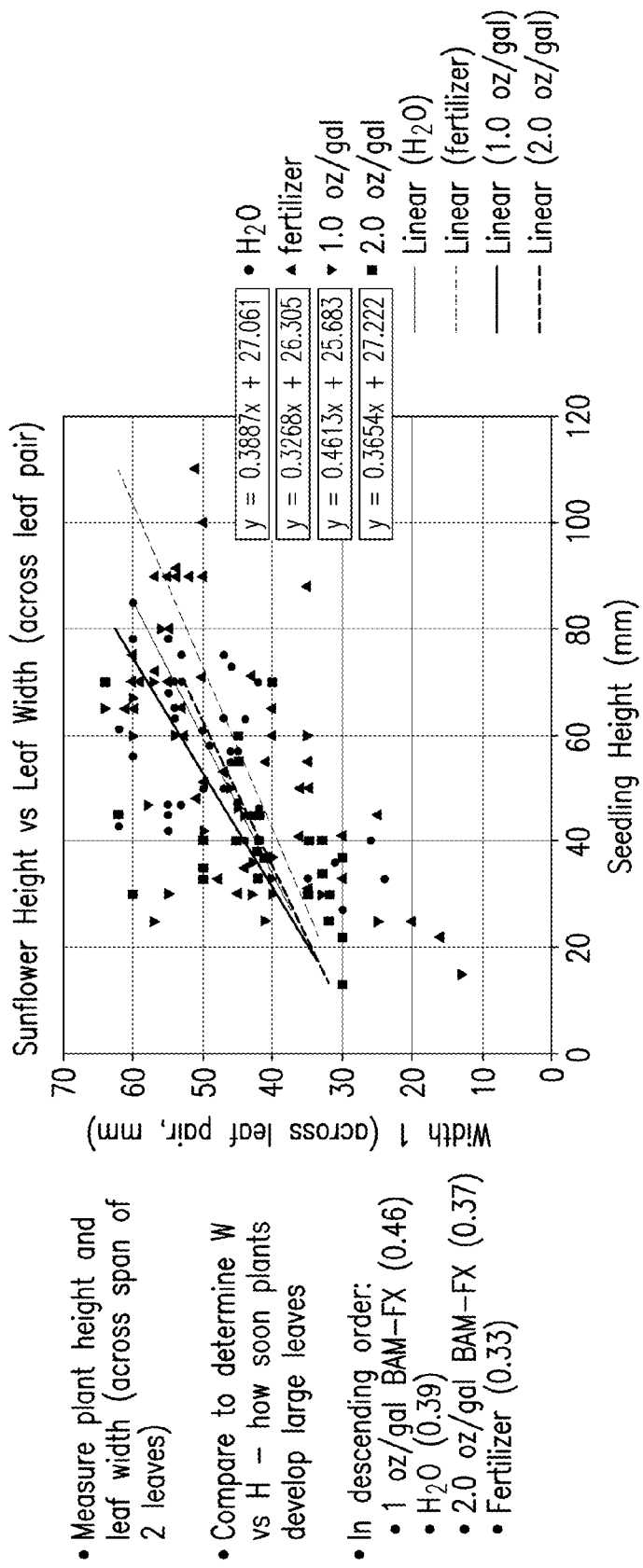
FIG. 1F depicts sunflower leaf size is increased with treating with the disclosed composition.

FIG. 1F depicts sunflower leaf size is increased with BAM-FX. Black oil sunflower seeds were planted in coir plugs and treated with BAM-FX or water (control) or fertilizer (10-10-10 NPK, control) and allowed to germinate in a moist environment, at warm temperature with light. Leaf sizes were measured in width of leaf and leaf pair, for comparison to height. The slope of a linear best fit line shows improvement of leaf size versus plant height for BAM-FX compared to fertilizer or water (vs. 1 oz/gal BAM-FX).
BAM-FX delayed sprout emergence from soil surface, apparently in favor of producing more complex and extensive root structure
Greater leaf size vs height, suggests faster maturity for sunflower seedlings+BAM-FX
1.0 oz/gal is an effective concentration to use, and 2.0 oz/gal causes greatest amount of root production and a consequent delay in emergence of sprouts

CONCLUSIONS

Seed treatment with BAM-FX has a significant positive effect on early root formation of seedlings
BAM-FX in growth medium improves root development
BAM-FX may accelerate maturation rate of seedlings, due to more roots, and better access to nutrients/water Optimal concentration of BAM-FX can be customized to fit the critical need of the crop, balancing root development with production of leaves for photosynthetic energy capture.

Example 2

Treatment of Potatoes using the Disclosed Method

Summary of Experiment:

Potato pieces with eyes were planted in soil (containing fertilizer) and allowed to grow with or without BAM-FX treatment. The effect on growth was measured over a period of 60 days, and then the plants were unearthed, observed, and weighed to obtain biomass estimates.

Experiment Design:

Potato pieces with eyes were planted in about 5 gallons of soil mix, which contained a base amount of fertilizer. BAM-FX was applied at 1 oz/gal as a soil drench, or water for the control group. After leaves emerged, one BAM-FX group also received a heavy foliar spray of BAM-FX at 1 oz/gal. The sample size (n=4) for this study is small due to space constraints. Growth was monitored until the end of the test at 60 days, when potato plants were removed from the soil, stolon formation noted, and wet weight of biomass was taken. Potatoes were not fertilized during the study, since the soil contains fertilizer initially and plants would not be able to achieve full size in this small amount of growth medium.

Detailed Description of Experiment:

White potatoes were cut into approximately equal size chunks (16 pieces), all having eyes. Treatment groups were as follows: (BAM-FA is a composition within the scope of the composition of claim 1).

Treatment Groups (4 plants each, ~118 mL (½ cup) volume per treatment):

1 oz/gal BAM-FX soil drench #1, 5, 9, 13
1 oz/gal BAM-FX soil drench and foliar spray #2, 6, 10, 14
2.0 oz/gal BAM-FX soil drench #3, 7, 11, 15
$H_2O$ #4, 8, 12, 16

Plants were grown in ambient temp/light until warmer weather allowed time outside (starting mid-March). Soil mix is ~5 gal. 50% garden soil and 50% topsoil (contains fertilizer). Plants were mixed randomly in terms of location.

potatoes were planted Feb. 24, 2014; treated with soil drench of BAM-FX or $H_2O$ for control group Plants were monitored for emergence of leaves from soil, and after most of leaves emerged, soil the was hill-up'ed for greater depth for plant BAM-FX foliar spray was applied on Apr. 2, 2014; heavy spray used)

leaf emergence, height of stems, number of stems was monitored after 60 days, general height/width of plant, number of stems was measured final biomass (g) of leaves and stems, roots taken laterally emerging stolons and note tuber initiation, if visible, were counted Exact dates for this experiment were as follows:

Feb. 24, 2014 t=0 plant potato pieces, cover w/soil, apply drench (BAM-FX or $H_2O$)

Mar. 10, 2014 First leaves noted in some groups—count/measure

Mar. 14, 2014 Observe plants, hill-up soil for greater depth

Apr. 2, 2014 Observe plants (baseline height measurement after hill-up soil) Apply BAM-FX foliar spray to one group Apr. 11, 2014 Observe plants, note leaf phytotoxicity in spray group Apr. 18, 2014 Take final (estimated) height and width of whole plant Apr. 20, 2014 Remove plants from soil, observe, prep for biomass measurement Apr. 21, 2014 Take final biomass of leaves+stems, roots Count stolons and note tuber initiation

RESULTS

Three plants were damaged (stems broken off) during the study: plants 6, 14 (1 oz/gal BAM-FX soil drench and foliar spray) and plant 12 ($H_2O$ control).

Figure 2:
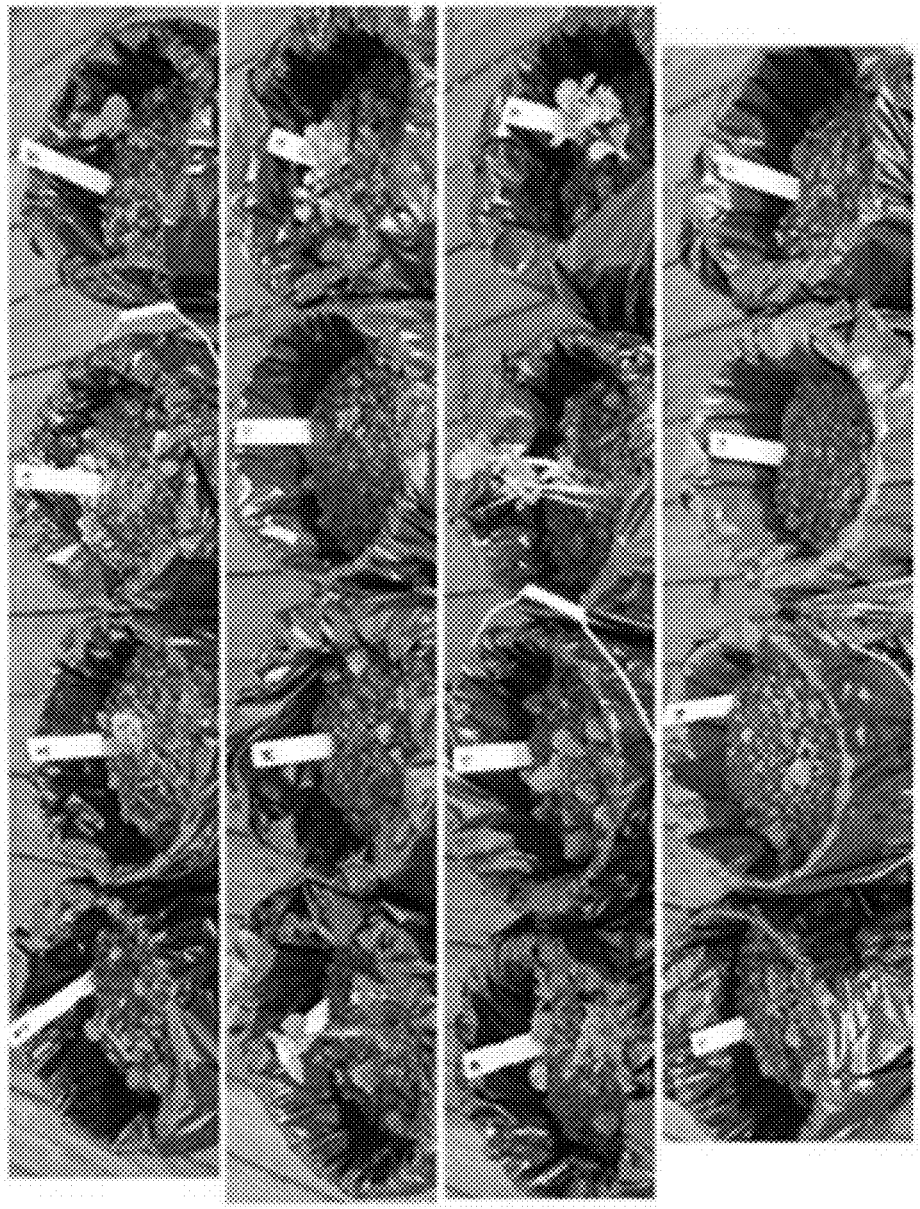
FIG. 2 shows potato plants at 5 weeks post-planting, the plants having composition treatment (1.0 oz/gal composition soil drench, 2.0 oz/gal composition soil drench, or 1.0 oz/gal composition soil drench and foliar spray), or control treatment (water only)

FIG. 2 shows the potato plants at 5 weeks post-planting. As shown in the photographs of FIG. 2, potatoes planted with BAM-FX treatment had earlier emergence of leaves and increased growth of leaves and stems, compared to the control plants. Soil drench of BAM-FX plus foliar spray after leaf emergence may be performing better than soil drench, alone. (n=4)

Figure 3:
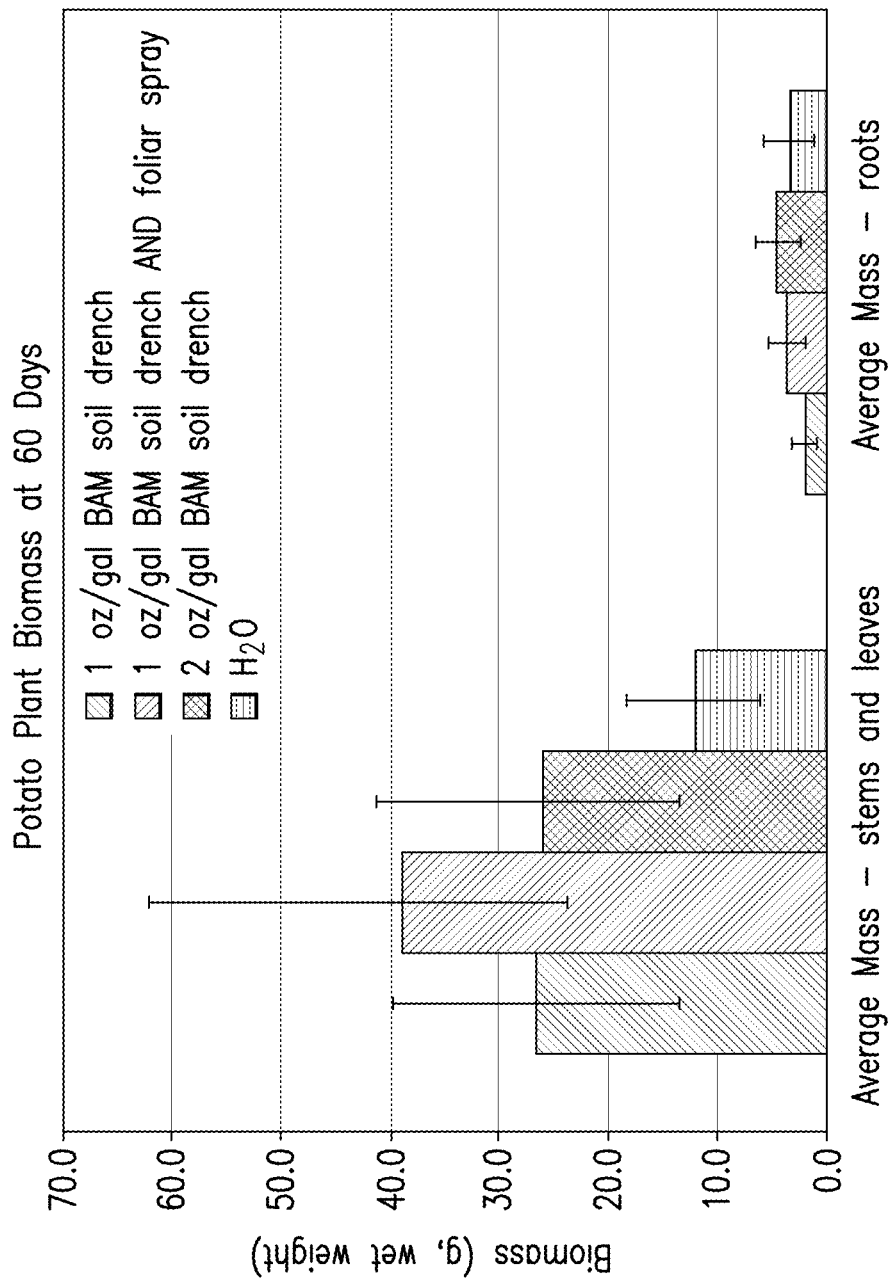
FIG. 3 is a graph showing average (mean) potato plant biomass (stems and leaves; roots) for composition treatment (1.0 oz/gal composition soil drench, 2.0 oz/gal composition soil drench, or 1.0 oz/gal composition soil drench and foliar spray), or control treatment (water only) potato plants after about 60 days of growth.

FIG. 3 is a graph showing the average biomass of the potato plants after ~60 days of growth (stems and leaves; roots). Biomass was measured by separating stems with leaves from roots; original seed potato piece was discarded. BAM-FX-treated potatoes showed a trend toward increased biomass, with significant increase in average mass of stems and leaves for 1 oz/gal BAM-FX soil drench and foliar spray compared to $H_2O$. (n=4)

Figure 4:
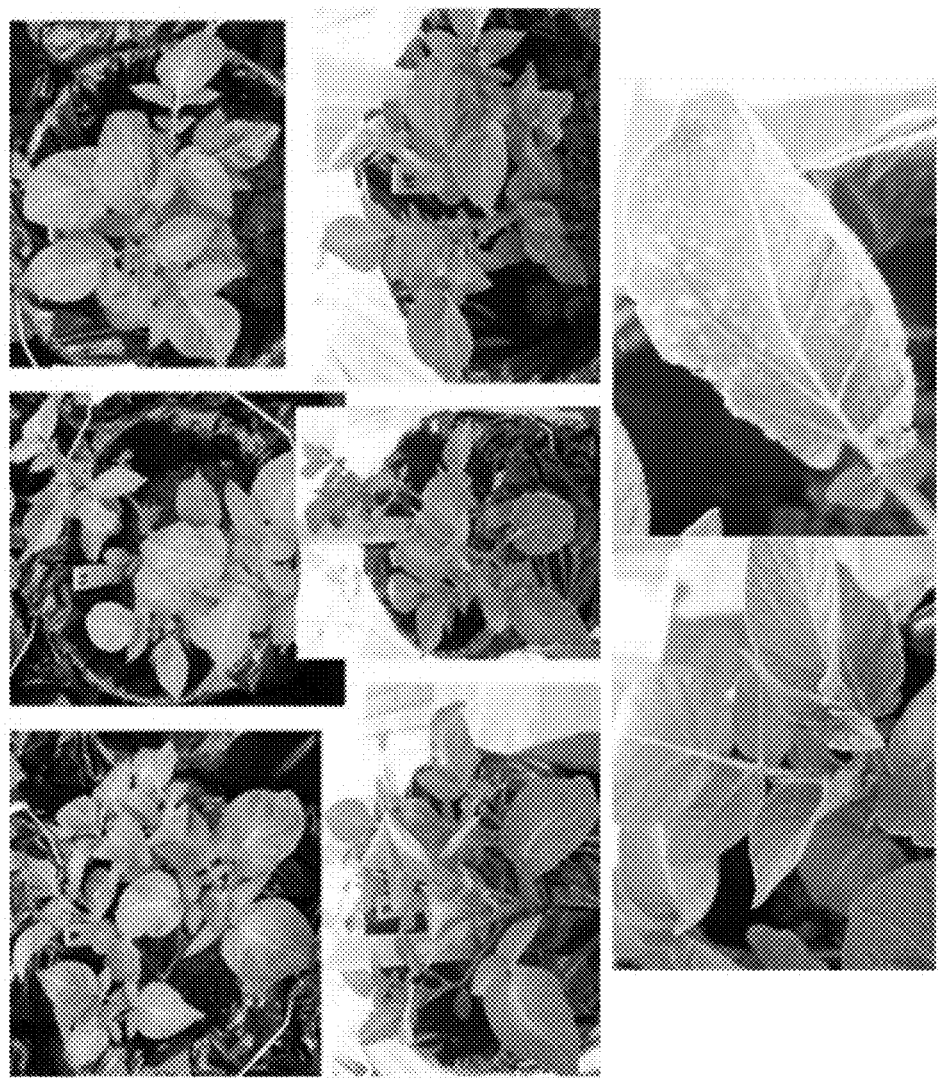
FIG. 4 shows overhead and side views showing plant breadth, branches and leaves of the potato plants that received composition soil drench and foliar spray combination.

FIG. 4 shows the potato plants that received BAM-FX soil drench and foliar spray combination. The top two rows of photographs of FIG. 4 are overhead and side views of the plants, and show large plant breadth and multiple branches. The left bottom row photographs of FIG. 4 shows healthy new leaves that are abundant on the plants. The right bottom row photographs of FIG. 4 shows leaves present during foliar spray and show phyotoxyicity of serrated edge and holes in leaf due to leaf cell damage. One plant was excluded as an outlier, due to unexplained delayed emergence, compared to the rest of the treatment group.

Figure 5:
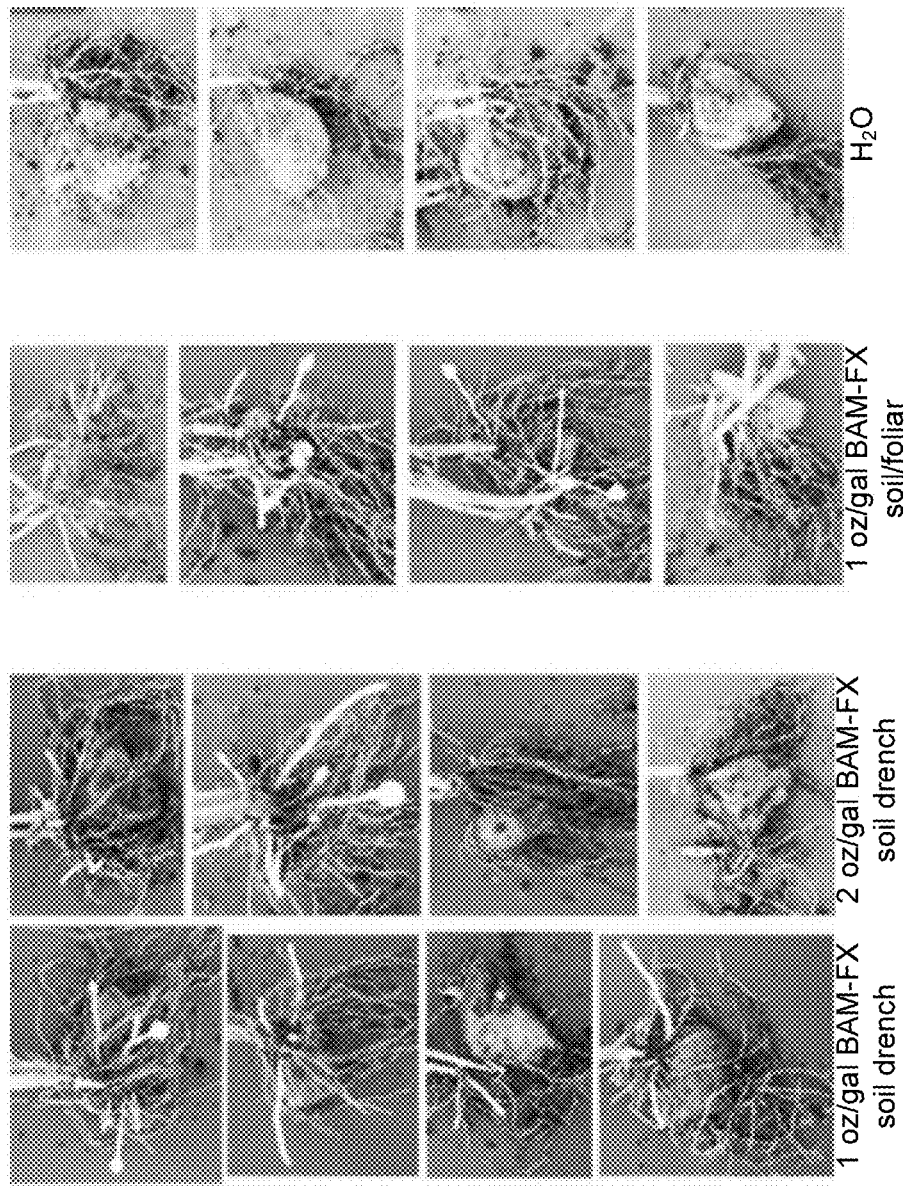
FIG. 5 shows stolon development of potato plants having composition treatment (1.0 oz/gal composition soil drench, 2.0 oz/gal composition soil drench, or 1.0 oz/gal composition soil drench and foliar spray), or control treatment (water only)

FIG. 5 shows stolon development of the potato plants. Base of plants are shown in FIG. 5, including original seed potato piece with sprouted eyes. The photographs show increased growth and potential tuber initiation for BAM-FX treated plants. Growth of lateral stolons is increased as a general trend for plants treated with BAM-FX. $H_2O$ control plants show only short stolons at the initial stages of growth. Several BAM-FX treated plants show the early stages of tuber initiation, visible as round growth, up to 1 cm in size, at the end of the stolon.

FIG. 6 is a table showing the masses of stems and leaves of the potato plants, as well as number of lateral stolons and presence of tubular initiation. Average (mean) masses of stems and leaves of the potato plants, as well as number of lateral stolons for each group are also shown in the table of FIG. 6. There is a significant increase in average mass of stems and leaves for 1 oz/gal BAM-FX soil drench and foliar spray compared to $H_2O$. (n=4) These results show that BAM-FX has dramatic, positive effects on the growth of potato plants in terms of early leaf emergence, vegetative growth, stolon formation, and tuber initiation. BAM-FX application by soil drench or foliar spray is effective for potatoes. For foliar spray, potato plants recover from initial phytotoxicity, showing a positive overall result due to the balance of new leaf production.

Summary of Results:

As a general trend, plants treated with BAM-FX showed earlier leaf emergence (sprouting from eyes) and greater early growth of leaves and stems.

Potato plants treated with BAM-FX achieved greater vegetative growth in terms of leaves and stems, relative to control. The soil drench and foliar spray group showed the largest plants with greatest amount of branching.

Plant biomass (wet weight) at 60 days showed increased vegetative growth of leaves and stems for plants treated with BAM-FX.

Foliar spray resulted in phytotoxicity to leaves that were present at the time of spraying. Later leaf development was healthy and abundant.

At 60 days after planting, stolon growth (length and number of stolons) of potato plants treated with BAM-FX was greater than that of $H_2O$ control plants.

At 60 days of growth, tuber initiation had only occurred in many of the potato plants treated with BAM-FX, but did not occur in the $H_2O$ control group plants.

BAM-FX applied as a soil drench at planting appears to be effective for giving potato plants a "head start", using a single BAM-FX soil drench treatment of ~120 mL of 1 oz/gal dilution, applied over the planted seed potato.

BAM-FX applied as a foliar spray after leaf emergence appears to be effective for causing increased vegetative growth and faster maturation (stolon formation, tuber initiation) of potato plants, using a foliar spray treatment of <10 mL of 1 oz/gal dilution, applied as a spray to wet the leaves of the plant.

What is claimed is:

1. A method of supplementing nutritional intake of a living plant, the method comprising steps of:
    treating a plant with a composition, the composition being formed by:
        preparing a solution of ammonium hydrogen sulfate $((NH_4)HSO_4)$ using sulfuric acid $(H_2SO_4)$;
        diluting the ammonium hydrogen sulfate with water to form a mixture;
        adding zinc sulfate $(ZnSO_4)$ and copper sulfate $(CuSO_4)$ to the mixture;
        agitating the mixture until the ammonium hydrogen sulfate, the sulfuric acid, the water, the copper sulfate and the zinc sulfate are blended together to form a zinc metal-ligand complex comprising a first plurality of ammonia ligands and a copper metal-ligand complex comprising a second plurality of ammonia ligands;
        diluting the mixture with water to form the composition.

2. The method as recited in claim 1, further comprising adding at least one delivery agent to the composition prior to the step of treating, the delivery agent selected from the group consisting of a surfactant, dimethyl sulfoxide, a urea based compound, a detergent, a hygroscopic compound and combinations thereof.

3. The method as recited in claim 1, wherein the ratio of zinc to copper is 7:2.

4. The method as recited in claim 1, were in the composition has a pH of less than 1.0.

5. The method as recited claim 1, further comprising a step of analyzing the plant to determine a specific nutrient required and, wherein the composition further includes a nutrient matched to the specific nutrient required.

6. The method as recited in claim 1, wherein the composition further includes at least one of manganese, magnesium, cobalt, chromium, molybdenum, selenium, and vanadium.

7. The method as recited in claim 1, wherein the composition further include at least one of a plant hormone, an auxin, or a plant extract.

8. A method of supplementing nutritional intake of a healthy, living plant, the method comprising steps of:
    treating a healthy plant with a composition, the composition being formed by:
        preparing a solution of ammonium hydrogen sulfate $((NH_4)HSO_4)$ using sulfuric acid $(H_2SO_4)$;
        diluting the ammonium hydrogen sulfate with water to for a mixture;
        adding zinc sulfate $(ZnSO_4)$ and copper sulfate $(CuSO_4)$ to the mixture, wherein the ratio of zinc to copper is 7:2;
        agitating the mixture until the ammonium hydrogen sulfate, the sulfuric acid, the water, the copper sulfate and the zinc sulfate are blended together to form a zinc metal-ligand complex comprising a first plurality of ammonia ligands and a copper metal-ligand complex comprising a second plurality of ammonia ligands;
        diluting the mixture with water to form the composition, wherein the composition has a pH of less than 1.0.

9. The method as recited in claim 8, wherein the step of treating the healthy plant comprises spraying the plant, injection into the plant, a drip application, or irrigation.

10. The method as recited in claim 8, wherein the step of treating the healthy plant comprises adding the composition to soil at the base of the plant.

11. The method as recited in claim 8, wherein the composition further comprising urea.

12. The method as recited in claim 8, wherein upon introduction the plant, the composition bonds with a super oxide dismutase composition and is transported to mineral-deficient parts of the plant.

13. The method as recited in claim 8, wherein the composition further includes at least one of manganese, magnesium, cobalt, chromium, molybdenum, selenium and vanadium.

14. The method as recited in claim 8, wherein the composition further comprises at least one of a plant hormone, an auxin, or a plant extract.

* * * * *